(12) United States Patent  
Wolter

(10) Patent No.: US 7,075,313 B2  
(45) Date of Patent: Jul. 11, 2006

(54) ELECTRONIC MEASURING INSTRUMENT AND METHOD FOR OPERATING AN ELECTRONIC MEASURING INSTRUMENT

(75) Inventor: Jurgen Wolter, Oberhausen (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 10/983,911

(22) Filed: Nov. 8, 2004

(65) Prior Publication Data

US 2005/0116722 A1 Jun. 2, 2005

(30) Foreign Application Priority Data

Dec. 1, 2003 (DE) ................................. 103 56 629

(51) Int. Cl.
*G01R 27/02* (2006.01)
*G06F 19/00* (2006.01)
(52) U.S. Cl. ......................................... 324/609; 702/80
(58) Field of Classification Search ................ 324/609; 702/80

See application file for complete search history.

(56) References Cited

U.S. PATENT DOCUMENTS

| 5,184,066 | A | * | 2/1993 | McEachern et al. ........ 324/73.1 |
| 5,301,649 | A | * | 4/1994 | Achleitner et al. .......... 123/609 |
| 6,096,094 | A | * | 8/2000 | Kay et al. .................... 717/168 |
| 6,349,274 | B1 | * | 2/2002 | Kay et al. ....................... 703/13 |
| 6,490,538 | B1 | | 12/2002 | Glombitzs et al. |
| 6,854,055 | B1 | * | 2/2005 | Stinus et al. ................. 713/100 |

FOREIGN PATENT DOCUMENTS

DE 10148029 A1 4/2003

OTHER PUBLICATIONS

European Search Report, European Patent Office, Jul. 27, 2005.

* cited by examiner

*Primary Examiner*—Anjan Deb
(74) *Attorney, Agent, or Firm*—Cesari and McKenna, LLP; John F. McKenna

(57) ABSTRACT

An electronic measuring instrument encompasses a sensor for the acquisition of process variables, a main memory for the operating parameters of the measuring instrument as well as several additional memory blocks for at least part of the operating parameters of the measuring instrument: The additional memory blocks includes a first memory block which serves to store active operating parameters, a second memory block for storing delivered preset operating parameters and a third memory block for storing application-specific operating parameters. An electronic measuring instrument of this design allows the user to access different versions of the operating parameters, enabling him for instance in the event of a failure or upon exchanging a component of the measuring instrument to activate the respectively appropriate version of operating parameters. A method for operating the instrument is also disclosed.

15 Claims, 2 Drawing Sheets

ELECTRONIC MEASURING INSTRUMENT AND METHOD FOR OPERATING AN ELECTRONIC MEASURING INSTRUMENT

This invention relates to an electronic measuring instrument incorporating a sensor for the detection of process variables, a main memory for the operating parameters of the measuring instrument and several additional memory blocks for at least part of the operating parameters of the measuring instrument, with one such additional memory block serving as the first memory block for storing active operating parameters. The invention further relates to a method for operating an electronic measuring instrument, which measuring instrument incorporates a sensor for the detection of process variables, a main memory for the operating parameters of the measuring instrument and several additional memory blocks for at least part of the operating parameters of the measuring instrument, with one such additional memory block serving as the first memory block for storing active operating parameters. An electronic measuring instrument of this type and a corresponding method for operating an electronic measuring instrument have been described earlier for instance in DE 101 48 029.

BACKGROUND OF THE INVENTION

The complete data record of a typical industrial-use electronic measuring instrument consists of several segments. These may include calibration parameters for the electronics, for instance for an analog current output value and for the amplification of an electrode voltage measurement as in the case of a magnetoinductive flowmeter. Also included may be calibration parameters for the sensor of the measuring instrument. One such example would be density calibration values for Coriolis-type mass flowmeters. In addition, application-specific parameters may be provided, allowing the measuring instrument to be customized for particular applications. Examples include certain time constants, or the unit of measure by which a process variable is displayed on a monitor. The data record may further include production parameters for instance for the purpose of adapting electronics components to their specific functions in a given measuring instrument, an example being the local bus address of a module. In particular, these parameters are also intended for multi-function component assemblies. And finally, service-specific parameters may be included by means of which the measuring instrument is customized for a given application above and beyond its basic functionality. These parameters are usually protected, meaning that they can be modified only by the manufacturer but not by the user of the measuring instrument.

The complete data record of an electronic measuring instrument may be subdivided into global parameters and local parameters. As a rule, global parameters apply to the measuring instrument as a whole whereas local parameters apply in each case to a limited subsection of the measuring instrument. The local parameters are typically stored on a specifically assigned circuit board and are not usually modified when a measuring instrument is customized for a particular application. In other words, the local parameters are stored where they are needed. In this fashion, when circuit boards or complete modules of the measuring instrument are exchanged, the settings such as calibration values they contain remain permanently intact. For example, the calibration parameters for the current output relate to the analog part of the measuring instrument and therefore have to be exchanged jointly with the latter.

While the electronics-calibration and production parameters are local parameters, the sensor-calibration, application-specific and service-related parameters are global parameters that relate to the measuring instrument as a whole. These global parameters, actively controlling the measuring instrument during its operation, are stored in the main memory of the measuring instrument. That main memory may even be "distributed", i.e. it may consist of several modular blocks in distributed locations of the measuring instrument. Moreover, backup copies of the global parameters may additionally be saved in one or several other memory areas.

For one example, reference is made to DE 101 48 029 A1 that specifies a primary and a secondary memory from which the parameters can be downloaded into the main memory. DE 101 48 029 A1 also provides for a memory module for standard operating parameters that can be downloaded into the main memory, should both the primary and the secondary memory have failed.

The method described in DE 101 48 029 A1 essentially constitutes a backup process for the operating parameters of the electronic measuring instrument whereby, in the event of at least a partial loss of operating parameters due to the failure of a memory block, the secondary memory backs up the primary memory and vice versa, while in the event of a total loss of the data in the primary and the secondary memories, the default or standard parameters can be downloaded from an additional backup memory module.

SUMMARY OF THE INVENTION

It is the objective of this invention to introduce an electronic measuring instrument and a method for operating an electronic measuring instrument that make it possible for a user to actively access particular operating parameters, for instance in order to reinitialize the measuring instrument.

Based on the concept of the electronic measuring instrument referred to above, this objective is achieved by incorporating a second memory block for saving the factory-preset operating parameters and a third memory block for storing application-specific operating parameters.

Thus, in addition to the memory block for saving active operating parameters, meaning those operating parameters that are stored in the main memory so as to ensure the operation of the measuring instrument, this invention provides for additional memory areas in the form of a second and a third memory block. The second memory block serves to store the preset operating parameters, meaning those operating parameters which, in addition to the basic default operating parameters, already include all necessary calibration parameters. The third memory block is reserved for storing application-specific operating parameters, meaning operating parameters that are tailored to the particular application requirements of the user of the measuring instrument.

The following will explain the different types of operating parameters of the measuring instrument: Standard operating parameters, also referred to as default operating parameters, are those that permit the basic operation of the measuring instrument, even if uncalibrated. According to prior art, such default operating parameters are stored in the measuring instrument so as to assure basic operational functionality of the measuring instrument. A preferred enhancement of this invention provides for a fourth memory block in which such standard operating parameters are saved. When in the operation of the measuring instrument with these default operating parameters a calibration or calibrated measurement is performed, the calibration values remain preserved, allowing for a new version of operating parameters, i.e. preset operating parameters, to be stored, in this case—according to the invention—in the second memory block. Downloading the preset operating parameters into the main memory of the measuring instrument now permits calibrated measuring operation.

Still, such calibrated measuring operation is not yet customized for the particular application of the instrument user. This is where the application-specific operating parameters come in, which, according to the invention, are stored in the third memory block. In this case, certain parameters are replaced by parameters that are customized for the user's particular application.

The set of parameters for initializing the measuring instrument upon start-up is stored in the first memory block, assigned to hold active operating parameters. In other words, initializing the measuring instrument downloads the operating parameters from the first memory block into the main memory. To ensure that up-to-date operating parameters are used at all times, a preferred implementation of this invention provides for any newly modified operating parameters to be automatically copied into the first memory block, since these new operating parameters are now the active operating parameters.

In addition or as an alternative, another preferred embodiment of this invention provides for a fifth memory block for storing a temporary file of revised operating parameters. Specifically, this means that when operating parameters are changed, these changes are not immediately written into the main memory or the first memory block for storing the new active operating parameters but instead go into the fifth memory block. Not until the editing of the operating parameters has been acknowledged, confirming that these revised operating parameters are to be the new active operating parameters, will these be stored in the main memory and, as explained above, in the first memory block, which, after all, should at all times contain a copy of the active operating parameters.

Providing the aforementioned additional memory blocks is intended to enable the user of the electronic measuring instrument, for instance in the case of a changed application, to retrieve older versions of the operating parameters and thus recover older settings of the electronic measuring instrument. In that context, the version of the preset operating parameters is of particular importance since it also contains the sensor calibration parameters.

Another occasion when the operating parameters that differ from the active operating parameters prove useful is for instance when the measuring instrument was accidentally thrown out of adjustment to the point where the user would be unable to reset the measuring instrument into proper operating condition. In that case, it is possible to revert to the application-specific operating parameters as the starting point prior to the changes and, if necessary, even to the preset operating parameters. As a background consideration, it should be pointed out that a typical electronic measuring instrument often contains more than a hundred operating parameters, making it easy enough especially for an untrained user of the measuring instrument, when changing the operating parameters, to lose track of the changed operating parameters and, most of all, of their interactions.

Unlike prior-art measuring instruments and especially that described in DE 101 48 029 A1, the purpose of this invention is not to provide back-up capability, meaning data retrievability and recovery in the event of data losses, but to enable the user of the measuring instrument to actively access a particular version of operating parameters. To that end, a preferred enhanced embodiment of the invention provides for the main memory to be connected preferably to all additional memory blocks so as to permit the transfer of operating parameters. In yet another preferred configuration according to this invention, the additional memory blocks, and preferably all of them, are mutually interconnected so as to permit the transfer of operating parameters. The user of the measuring instrument can thus cause operating parameters to be transferred from one of the additional memory blocks to the main memory or to one of the other additional memory blocks.

In a preferred embodiment of the invention, the measuring instrument encompasses an electronics enclosure and an electronic module, which electronic module supports electronic devices and is removably inserted in the electronics enclosure. In a preferred configuration according to this invention, the main memory is contained in the electronic module. Also, in a preferred embodiment of the invention, the first memory block that stores active operating parameters and the second memory block that stores the preset operating parameters are housed in the electronics enclosure. As an especially preferred feature, the electronic module also accommodates the third memory block that stores application-specific operating parameters and/or the fourth memory block that stores the default operating parameters and/or the fifth memory block that stores the temporary file of the revised operating parameters. The advantages and capabilities offered by such a design will become evident especially in connection with the method, described below, for operating an electronic measuring instrument.

Based on the method referred to further above for operating an electronic measuring instrument, the stated objective is achieved by means of a second memory block for storing the preset operating parameters and a third memory block for storing application-specific operating parameters.

Analogous to the hardware configurations of the above-described electronic measuring instrument, preferred enhancements of the invention include a fourth memory block for saving default operating parameters and/or a fifth memory block for storing a temporary file of the revised operating parameters.

In a preferred enhanced configuration of the invention, the measuring instrument encompasses an electronics enclosure, an insert-type electronic module supporting electronic devices, an input device and an output device, said electronic module containing the main memory and at least part of the additional memory blocks, whereby, when the electronics enclosure, the sensor, and/or the electronic module are exchanged for a new electronics enclosure, new sensor, and/or new electronic module, the output device, upon initialization of the measuring instrument, automatically queries whether the electronics enclosure, sensor, and/or electronic module have been replaced.

Such query can be useful insofar as, in a preferred embodiment, provision is made whereby, upon an entry made via the input device stating that the electronics enclosure, sensor, and/or electronic module have been exchanged, an automatic decision takes place as to whether the operating parameters stored in the main memory are to be modified. Such modification of the operating parameters stored in the main memory may be necessary or at least desirable to the extent that the new electronics enclosure, the new sensor, and/or the new electronic module require at least partially new or at least different operating parameters.

In one preferred implementation of the invention, a specific provision is made whereby, upon an entry to the effect that the electronics enclosure has been exchanged, the operating parameters stored in the main memory are not automatically modified. This is practical in cases where the operating parameters stored in the main memory do not relate to any functions of the electronics enclosure, which would be the case when all functional key devices are integrated in the electronic module.

As another feature in a preferred design version of this invention, the second memory block that stores preset operating parameters is mounted within the electronics enclosure and, upon an entry stating that the sensor and the electronics enclosure have been exchanged, the preset operating parameters stored in the second memory block are automatically and preferably completely copied into the main memory. This allows the sensor calibration parameter(s) in the preset operating parameter version to be downloaded for the new sensor, meaning that the parameters contained in the main memory are overwritten by the preset operating parameters downloaded from the second memory block.

Finally, in a preferred configuration of the invention, the first memory block that stores the active operating parameters is housed in the electronics enclosure, and upon an entry stating that the electronic module has been exchanged, the active operating parameters stored in the first memory block are automatically and, preferably, completely copied into the main memory.

To assure that the first memory block at all times contains a copy of the active operating parameters, a preferred version of the invention provides for the operating parameters stored in the main memory to be automatically and, preferably, completely copied into the first memory block.

There are numerous specific ways in which the electronic measuring instrument according to this invention and the novel method for operating an electronic measuring instrument can be configured and enhanced. In that context, attention is invited to the dependent patent claims and to the following detailed description of a preferred embodiment of the invention with reference to the attached diagrams.

DETAILED DESCRIPTION OF AN ILLUSTRATIVE EMBODIMENT

Figure 1:
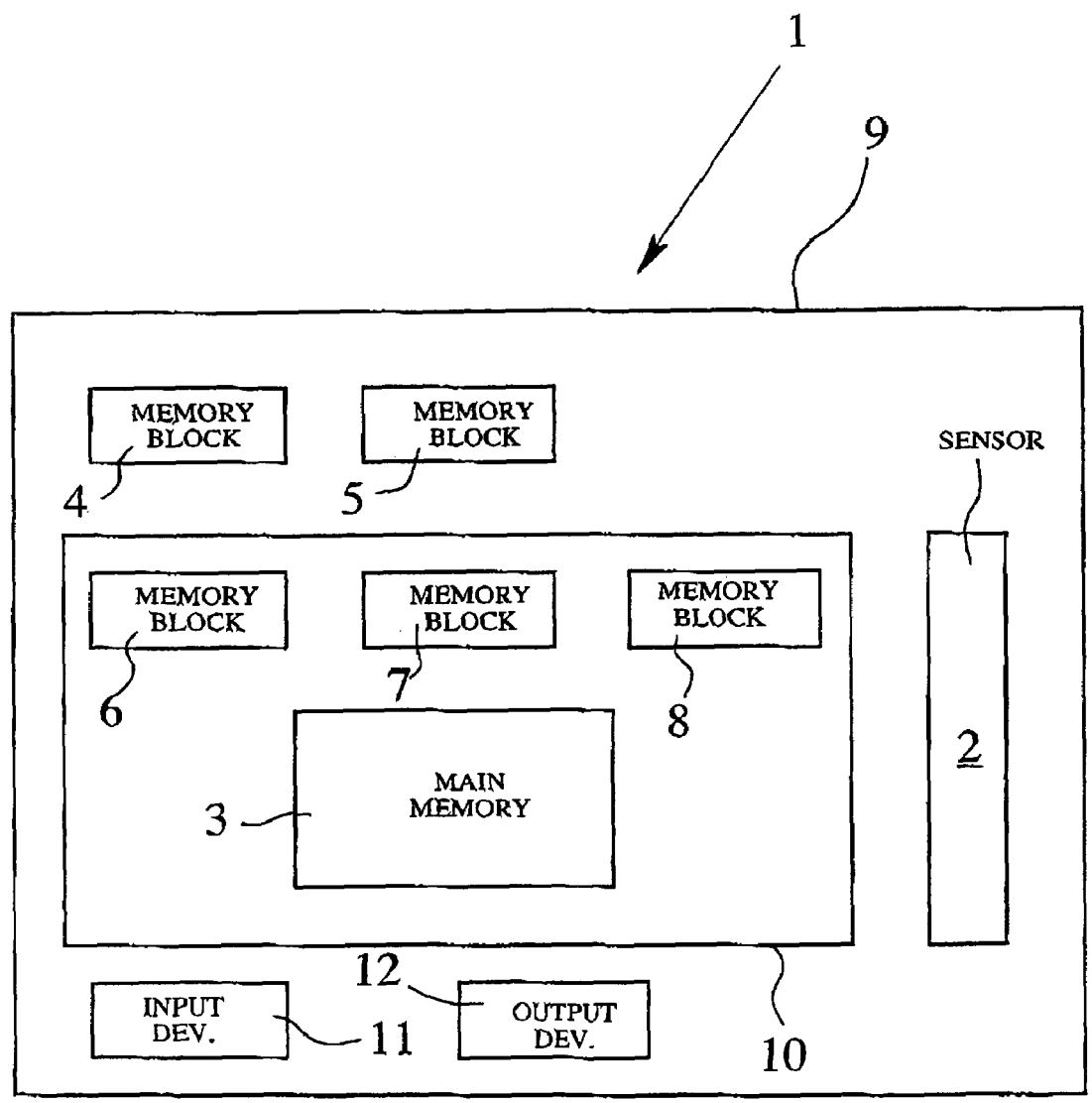
FIG. 1 is a systematic representation of an electronic measuring instrument according to a preferred embodiment of this invention.

As shown in FIG. 1, the electronic measuring instrument 1 in the preferred embodiment of the invention here described encompasses a sensor 2 for the acquisition of a process variable, a main memory 3 for storing operating parameters of the measuring instrument, as well as additional memory blocks 4, 5, 6, 7, 8 used especially for global parameters. Of the additional memory blocks, the first memory block 4 serves to save the active operating parameters, meaning that the first memory block contains a copy of the operating parameters stored in the main memory 3 so as to ensure the measuring operation of the measuring instrument 1.

Another additional memory area is provided in the form of the second memory block 5 for storing delivered, preset operating parameters. These preset operating parameters also include the calibration parameters for the sensor 3. As yet another additional memory area, the third memory block 6 serves to store application-specific operating parameters. The application-specific operating parameters vary in adaptation to the application intended by the user of the measuring instrument 1. Finally, additional memory areas are provided in the form of a fourth memory block 7 and a fifth memory block 8, of which the fourth memory block 7 serves to save standard operating parameters so as to ensure the basic operation of the measuring instrument 1 while the fifth memory block 8 stores a temporary file of any revised operating parameters.

In the event of a modification of the operating parameters contained in the main memory 3, storing a temporary file of the revised new operating parameters will prevent the new changes from being immediately written into the main memory 3 or into the first memory block 4 that contains a copy of the operating parameters in the main memory. Instead, the new version will first be sent to the fifth memory block 8. Not until is has been acknowledged that the revised operating parameters are indeed to be downloaded will these revised operating parameters be transferred into the main memory 3 by copying the temporary file of the operating parameters from the fifth memory block 8 into the main memory.

To permit a transfer of operating parameters between the main memory 3 and the individual additional memory blocks 4, 5, 6, 7, 8, the main memory 3 and all additional memory blocks 4, 5, 6, 7, 8 are interconnected, which for complexity considerations is not shown in FIG. 1.

Figure 2A:
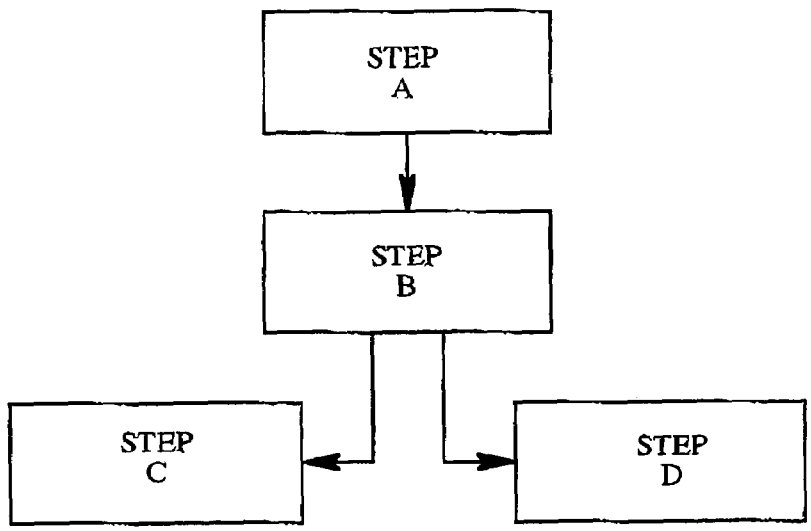
FIGS. 2a and 2b are systematic flow charts for modifying the operating parameters stored in the main memory after the exchange of a component of the FIG. 1 electronic measuring instrument.
Figure 2B:
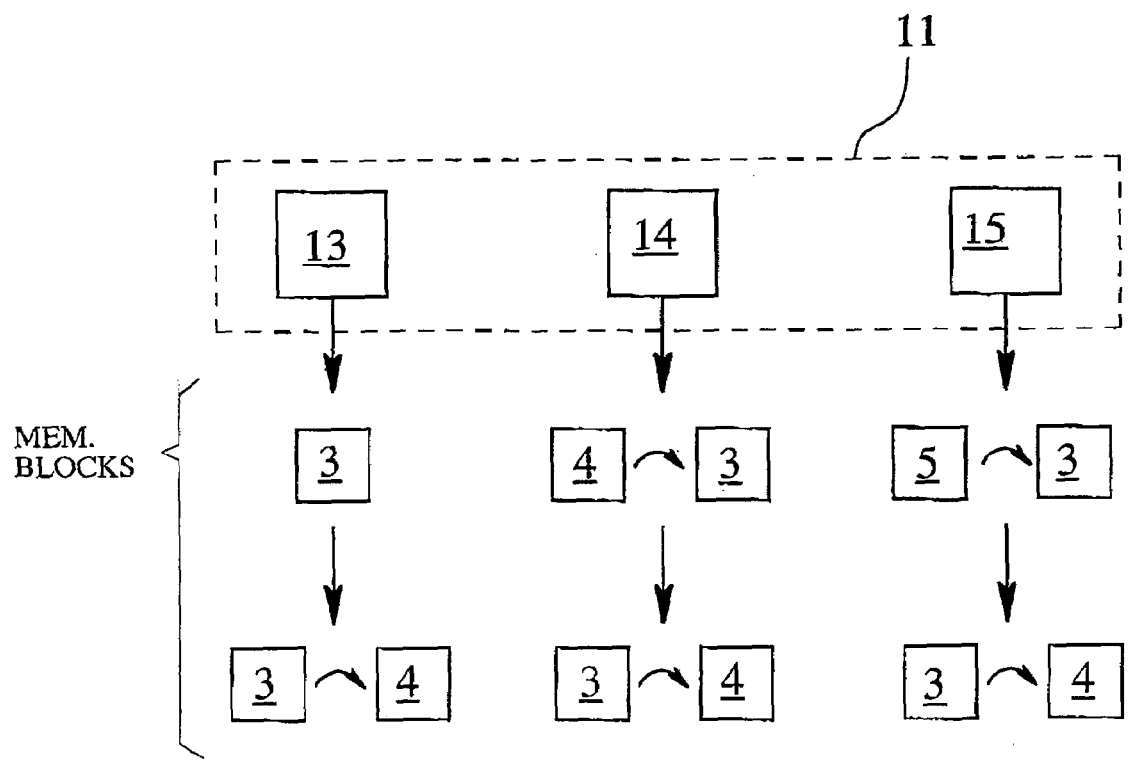

The electronic measuring instrument according to the preferred embodiment of the invention here described incorporates an electronics enclosure 9 and an electronic module 10. The electronic module 10 can be inserted into and removed from the electronics enclosure 9. The electronic module 10 supports various electronic devices, not illustrated in FIG. 1, meaning all electronic devices that are needed for the operation of the electronic measuring instrument 1 according to this preferred embodiment of the invention. The electronics enclosure serves the purpose of housing the electronic module and its electronic devices and protecting them from outside elements. In addition, the electronics enclosure 9 accommodates an input device 11 and an output device 12, serving the following functions:

As illustrated in FIG. 2a, the initialization (step A) of the electronic measuring instrument 1 according to the preferred embodiment of the invention here described is followed by a scan of the serial numbers of the sensor 2, the electronics enclosure 9 and the electronic module 10 (step B). If the serial numbers match those that have been valid to date, meaning that no components have been exchanged, normal measuring operations can be initiated (step C). But if at least one of the serial numbers of the sensor 2, the electronics enclosure 9, and/or the electronic module 10 fails to match the previous serial number, the user of the electronic measuring instrument 1 is given an opportunity to enter certain data via the input device 11, as indicated in FIG. 2b. An appropriate prompt is received through the output device 12.

FIG. 2b shows how the output device 12 prompts the user of the electronic measuring instrument to push one of three preset buttons 13, 14, 15 of the input device 11. The output device 12 prompts the user of the electronic measuring instrument to push the first button, 13, when the electronics enclosure 9 has been exchanged, the second button, 14, when the electronic module 10 has been exchanged, and the third button, 15, when the sensor 2 has been exchanged together with the electronics enclosure 9.

When the user of the electronic measuring instrument pushes the first button 13, no automatic modification of the operating parameters stored in the main memory 3 is triggered, meaning that the operating parameters stored in the main memory 3 remain unchanged. When the second button 14 is pushed, the active operating parameters stored in the first memory block 4 will be automatically and completely copied into the main memory 3. Finally, when the third button 15 is pushed, the preset operating parameters saved in the second memory block 5 along with the calibration parameters for the sensor 2 will be automatically and completely copied into the main memory 3.

The operating parameters will in any event be copied from the main memory 3 into the first memory block 4 so as to assure that the first memory block 4 will at all times contain an up-to-date copy of the operating parameters that are stored in the main memory 3 and used in the current measuring operation of the electronic measuring instrument 1. The fact that a corresponding version of the operating parameters already resides in part in the first memory block 4 and is overwritten in the process, is of no consequence and is readily accepted.

What is claimed is:

1. A method for operating an electronic measuring instrument, which measuring instrument incorporates a sensor for the acquisition of process variables, a main memory for storing operating parameters of the measuring instrument as well as several additional memory blocks for at least part of the operating parameters of the measuring instrument, said additional memory blocks including a first memory block which serves to save active operating parameters, wherein the measuring instrument further encompasses an electronics enclosure, an electronic module incorporating electronic devices, an input device and an output device, said electronic module containing the main memory and said electronics enclosure housing at least part of the additional memory blocks, said method comprising the steps of providing a second memory block for storing delivered preset operating parameters and providing a third memory block for storing application-specific operating parameters, and upon first initialization of the measuring instrument after at least one of the electronics enclosure, the sensor and the electronic module being exchanged for a new at least one of the electronics enclosure, sensor and electronic module, the output device automatically queries whether said at least one of the electronics enclosure, sensor and electronic module has in fact been exchanged.

2. The method as in claim 1, wherein in response to an entry made via the input device to the effect that said at least one of the electronics enclosure, sensor, and electronic module has been exchanged, the system automatically decides whether the operating parameters stored in the main memory are to be revised.

3. The method as in claim 1 or 2, and including the additional step of providing a fourth memory block for storage of default operating parameters.

4. The method as in claim 1 or 2, including the additional step of providing a fifth memory block for storing a temporary file of a revised version of the operating parameters.

5. A method for operating an electronic measuring instrument, which measuring instrument incorporates a sensor for the acquisition of process variables, a main memory for storing operating parameters of the measuring instrument as well as several additional memory blocks for at least part of the operating parameters of the measuring instrument, said additional memory blocks including a first memory block which serves to save active operating parameters, wherein the measuring instrument also encompasses an electronics enclosure, an electronic module incorporating electronic devices, an input device and an output device, said electronic module containing the main memory and said electronics enclosure housing at least part of the additional memory blocks, said method comprising the steps of providing a second memory block for storing delivered preset operating parameters and providing a third memory block for storing application-specific operating parameters, and upon first initialization of the measuring instrument after at least one of the electronics enclosure, sensor and electronic module being exchanged for a new at least one of the electronics enclosure, sensor and electronic module, the output device automatically queries whether said at least one of the electronics enclosure, sensor and electronic module has in fact been exchanged, wherein in response to an entry made via the input device to the effect that said at least one of the electronics enclosure, sensor and electronic module has been exchanged, the system automatically decides whether the operating parameters stored in the main memory are to be revised, and wherein, when an entry is made stating that the electronics enclosure has been exchanged, no automatic modification of the operating parameters stored in the main memory takes place.

6. The method as in claim 5, and including the additional step of providing a fourth memory block for storage of default operating parameters.

7. The method as in claim 5 or 6, including the additional step of providing a fifth memory block for storing a temporary file of a revised version of the operating parameters.

8. A method for operating an electronic measuring instrument, which measuring instrument incorporates a sensor for the acquisition of process variables, a main memory for storing operating parameters of the measuring instrument as well as several additional memory blocks for at least part of the operating parameters of the measuring instrument, said additional memory blocks including a first memory block which serves to save active operating parameters, wherein the measuring instrument also encompasses an electronics enclosure, an electronic module incorporating electronic devices, an input device and an output device, said electronic module containing the main memory and said electronics housing at least part of the additional memory blocks, said method comprising the steps of providing a second memory block for storing delivered preset operating parameters and providing a third memory block for storing application-specific operating parameters, and upon first initialization of the measuring instrument after at least one of the electronics enclosure, sensor and electronic module is changed for a new at least one of the electronics enclosure, sensor and electronic module, the output device automatically queries whether said at least one of the electronics enclosure, senor and electronic module has in fact been exchanged, wherein in response to an entry made via the input device to the effect that said at least one of the electronics enclosure, sensor and the electronic module has been exchanged, the system automatically decides whether the operating parameters stored in the main memory are to be revised, and wherein the second memory block serving to store delivered preset operating parameters is accommodated in the electronics enclosure and, when an entry is made stating that the sensor and the electronics enclosure have been exchanged, the delivered preset operating parameters stored in the second memory block are automatically copied into the main memory.

9. The method as in claim 8, and including the additional step of providing a fourth memory block for storage of default operating parameters.

10. The method as in claim 8 or 9, including the additional step of providing a fifth memory block for storing a temporary file of a revised version of the operating parameters.

11. The method as in claim 8 or 9, wherein the operating parameters now stored in the main memory are automatically copied into the first memory block.

12. A method for operating an electronic measuring instrument, which measuring instrument incorporates a sensor for the acquisition of process variables, a main memory for storing operating parameters of the measuring instrument as well as several additional memory blocks for at least part of the operating parameters of the measuring instrument, said additional memory blocks including a first memory block which serves to save active operating parameters, wherein the measuring instrument also encompasses an electronics enclosure, an electronic module incorporating electronic devices, an input device and an output device, said electronic module containing the main memory and said electronics enclosure housing at least part of the additional memory blocks, said method comprising the steps of providing a second memory block for storing delivered preset operating parameters and a third memory block for storing application-specific operating parameters, and upon first initialization of the measuring instrument after at least one of the electronics enclosure, sensor and electronic module have been exchanged for a new at least one of the electronics enclosure, sensor and electronic module, the output device automatically queries whether said at least one of the electronics enclosure, sensor and electronic module has in fact been exchanged, wherein in response to an entry made via the input device to the effect that said at least one of the electronics enclosure, sensor and electronic module has been exchanged, the system automatically decides whether the operating parameters stored in the main memory are to be revised, and wherein the first memory block serving to store active operating parameters is accommodated in the electronics enclosure and, when an entry is made stating that the electronic module has been exchanged, the active operating parameters stored in the first memory block are automatically copied into the main memory.

13. The method as in claim 12, and including the additional step of providing a fourth memory block for storage of default operating parameters.

14. The method as in claim 12 or 13, including the additional step of providing a fifth memory block for storing a temporary file of a revised version of the operating parameters.

15. The method as in claim 12 or 13, wherein the operating parameters now stored in the main memory are automatically copied into the first memory block.

* * * * *